US006163034A

United States Patent [19]

Khvostov

[11] Patent Number: 6,163,034

[45] Date of Patent: Dec. 19, 2000

[54] OPTICAL SENSOR WITH PLANAR WALL

[75] Inventor: Vitold Khvostov, Kyiv, Ukraine

[73] Assignee: Cashcode Company Inc., Concord

[21] Appl. No.: 09/262,930

[22] Filed: Mar. 5, 1999

[51] Int. Cl.[7] ............................ G06K 7/015; G06K 5/00; G01J 3/50

[52] U.S. Cl. ........................... 250/556; 250/557; 250/226

[58] Field of Search ..................................... 250/556, 557, 250/226, 223 R; 356/71; 382/7; 209/534

[56] References Cited

U.S. PATENT DOCUMENTS

| | | |
|---|---|---|
| 4,650,319 | 3/1987 | Wittich et al. . |
| 4,650,320 | 3/1987 | Potter et al. . |
| 5,304,813 | 4/1994 | De Man . |
| 5,686,720 | 11/1997 | Tullis .................................. 250/208.1 |

FOREIGN PATENT DOCUMENTS

| | | |
|---|---|---|
| 2093179 | 8/1982 | United Kingdom . |

*Primary Examiner*—Georgia Epps
*Assistant Examiner*—Michael A. Lucas

[57] ABSTRACT

An improved optical sensor for a banknote validator uses an aspherical lens having a planar wall as a combination radiation plug for a port in the pathway and a focusing arrangement. Emitters and receivers are closely positioned on a common support and generally located at the focal point of the lens. The radiation reflected by a banknote is focused and received by the receiver. The lens also serves to collimate the produced radiation of the emitters for scanning of the banknote.

11 Claims, 1 Drawing Sheet

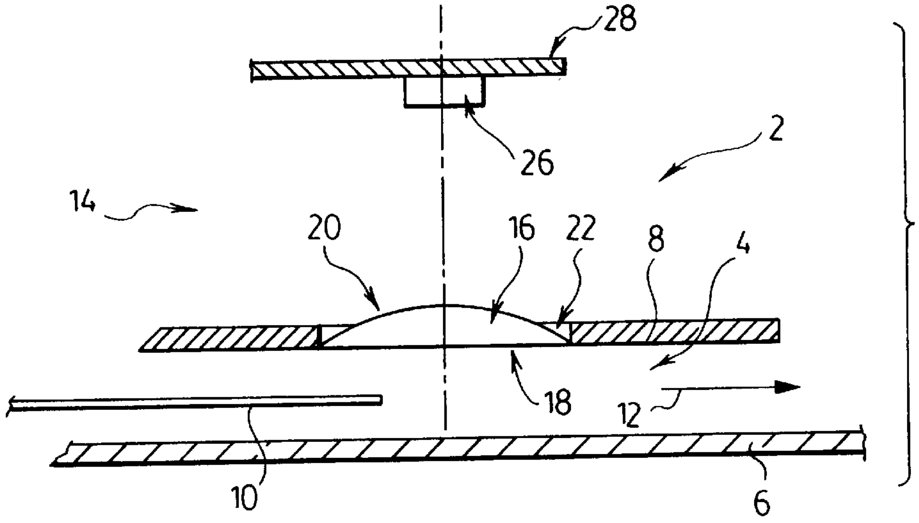
FIG.1.
FIG.2.
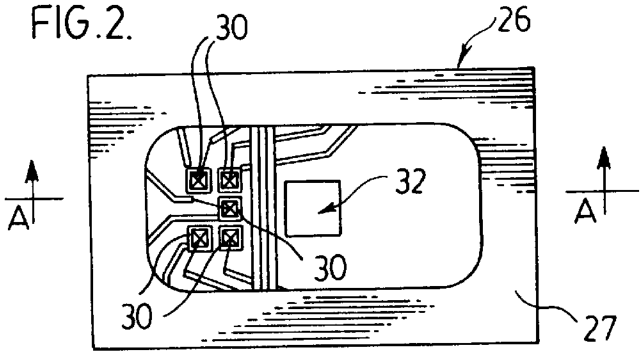
FIG.3.
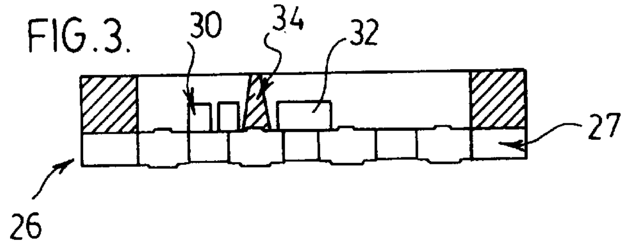
FIG.4.
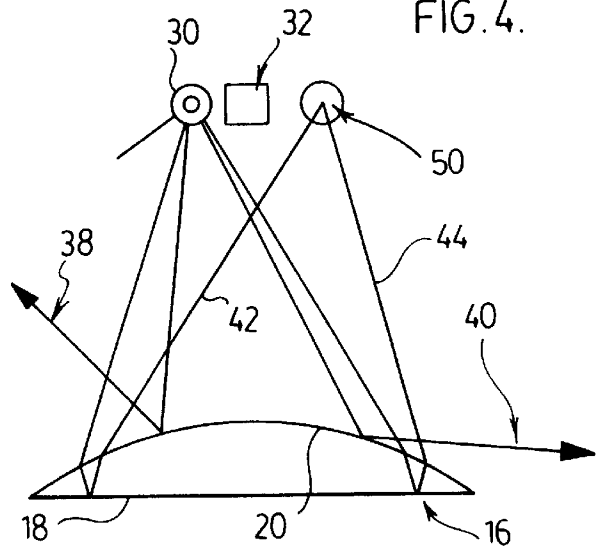

OPTICAL SENSOR WITH PLANAR WALL

FIELD OF THE INVENTION

The present invention relates to validators, and in particular, relates to validators having optical scanners for measuring the reflectance of paper banknotes as they move past a sensor.

BACKGROUND OF THE INVENTION

The evaluation of banknotes to determine their authenticity in theory is relatively straightforward, however, in practice, it is quite difficult to carry out in a cost effective manner. Banknotes are evaluated by scanning stripped regions of the banknote or security paper as it is moved past a sensor. The banknote is normally evaluated with respect to optical characteristics, magnetic characteristics and/or with respect to capacitance.

The optical characteristics of a banknote are evaluated by measuring the amount of radiation reflected from the banknote. The optical sensors include emitters which produce radiation of different wave lengths, and focus the radiation on a particular target location of the banknote. The reflected radiation is measured and compared with reference signals to determine whether to accept or reject the banknote.

This optical evaluation is difficult in that the exact spacing of the banknote from the optical sensor varies as the banknote is, essentially, floating within an oversized pathway along which the banknote moves. In addition, the banknote can be angled in the pathway longitudinally and laterally, even though the banknote is generally centered. Thus, the spacing and the angle change, which influences the measured signal. Furthermore, creases in the banknote also cause angle variations which in turn impact the amount of radiation that will be reflected from the banknote back to a sensor. Other factors which affect the measured signal include the amount of radiation reflected back to a receiver by the optical sensor which radiation has not been reflected by the banknote. This portion of the signal typically produces what is referred to as cross-talk and it is desirable to keep this to as small a level as possible.

The pathway typically includes additional elements or surfaces between the optical sensor and the banknote and these elements or surfaces can cause reflected radiation, which again is not dependent upon the banknote. For example, there could be a window member which forms part of the pathway with the optical sensor directly behind the window. The window provides the desired smooth pathway, but increases cross-talk.

Other optical banknote scanning arrangements have positioned the emitter at a first acute angle, relative to the banknote, and appropriately positioned the receiver at a different angle for receiving the reflected radiation. Two distinct optical arrangements are provided to focus the emitted and received radiation. Unfortunately, these systems produce significant variations with respect to variations in the position of the banknote in the pathway as well as variations due to creases in the banknote.

The present invention provides an optical sensor with improved accuracy in the measurement of the optical reflecting properties of a banknote as the banknote is moved past the sensor.

SUMMARY OF THE INVENTION

A validator according to the present invention comprises a pathway through which the banknote is moved and an optical sensor is positioned in this pathway for evaluating the optical characteristics on a face of the banknote. The optical sensor comprises a lens, a plurality of radiation emitters and a radiation receiver. The lens has a first surface which is generally planar and a second surface which is convex. These surfaces cooperating to define a focal point of the lens which faces the convex surface. The pathway includes an opening which receives the lens, with the planar surface of the lens closing the opening and forming part of the pathway. The radiation emitters and radiation receiver are closely clustered at the focal point of the lens and include a shield member which isolates the receiver from direct radiation of the emitters. The lens collimates the emitted radiation of the emitters to produce generally parallel rays of radiation which are reflected by the banknote as it moves past the sensor. The reflected radiation from the banknote that impinges on the lens is focused by the lens and directed to the receiver. The lens directs radiation reflected by the convex surface and the planar surface of the lens away from the receiver and reduces cross-talk between the receiver and the emitters.

According to a preferred aspect of the invention, the emitters each emit radiation of a different wavelength.

According to a further aspect of the invention, the emitters are clustered together with minimal spacing therebetween.

According to yet a further aspect of the invention, the emitters and the receiver are separated by a screening member.

According to yet a further aspect of the invention, the emitters and the receiver are all located on a common circuit board.

According to yet a further aspect of the invention, the emitters include at least two different types of emitters to produce radiation having two desired wave lengths for investigating a banknote.

According to yet a further aspect of the invention, five emitters are provided, each of which produce a wave length of a different radiation for investigating the banknote.

BRIEF DESCRIPTION OF THE DRAWINGS

Preferred embodiments of the invention are shown in the drawings, wherein:

FIG. 1 is an illustrative view of part of a validator showing a banknote moving past an optical sensor;

FIG. 2 is a top view of the optoelectronic components of the optical sensor;

FIG. 3 is a sectional view taken along AA of FIG. 2; and

FIG. 4 is an illustrative view showing the positioning of the emitters and receivers to reduce cross-talk.

DETAILED DESCRIPTION OF THE PREFERRED EMBODIMENTS

The validator 2 includes a pathway 4 for moving the banknote 10 past an optical sensor 14. The pathway includes an exterior wall 6 and an interior wall 8 having a port 22 in the interior wall 8. The optical sensor 14 includes a lens 16 which is sized to fit into the port 22 as generally shown in FIG. 1. The lens 16 includes a planar surface 18 which forms a continuation of the interior wall 8 of the pathway and effectively closes the port 22. The lens also includes a convex surface 20 which faces the opto-electronic components 26. The lens is preferably, an aspherical lens.

The lens cooperates with the opto-electronic component 26 secured on the circuit board 28. The opto-electronic component includes a series of pins soldered to the circuit board.

Details of the opto-electronic component 26 and its relationship with lens 16 are shown in FIGS. 2 and 3. Five emitters 30 are placed in a cluster type arrangement on the support 27 such that the spacing between emitters is quite small. The emitters are non-directional and preferably emit radiation of different wave lengths for evaluating the reflecting properties of the banknote as it moves past the sensor. A receiver 32 is also positioned on the support 27 and is separated from the emitters 30 by means of the spacer or barrier 34 which shields the receiver 32 from direct radiation of the emitters 30. The receiver 32 is positioned in close proximity to the emitters and slightly offset from the focal point.

The optical properties of the sensing arrangement are shown in additional detail in FIG. 4. The emitters 30 are located at the focus of the lens and produce radiation. Most of the radiation is transmitted through the lens and forms a collimated beam for radiating a strip of the banknote as it moves past the sensor. The radiation reflected by the banknote that impinges on the lens is redirected and focused on the receiver 32. Variation of the spacing of the banknote from the lens does not appreciably effect the results, as the radiation has been collimated and is in parallel rays. The slight offset in the position of the receiver relative to the focal point is not significant.

The radiation reflected by the lens indicated by reflected beams 38, 40, 42 and 44 and if received contributes to undesirable cross talk. Beams 38 and 40 strike the convex surface 20 of the lens and are reflected by the surface. Most of the radiation will pass through the lens for irradiating the banknote, but there is a portion of the radiation that will be reflected. The convex nature of the lens directs this radiation outwardly and away from the receiver 32. In this way, reflected radiation from the aspherical surface 20 of the lens is directed outwardly and the effect on the signal received by the receiver 32 is minimal.

Reflected radiation 42 and 44 is produced due to radiation which passes through the first surface of the lens and is reflected by the planar surface 18 of the lens. This reflected radiation is focused at point 50 located to one side of the receiver 32. In this way, reflected radiation returned by the planar surface 18 is focused at a point exterior to one side of the receiver and thus the effect of such reflected radiation on the receiver is reduced.

Conveniently, the opto-receiver 32 and the emitters 30 are all produced on a common support and the position thereof is accurately determined. The aspherical lens 16 appropriately processes the emitted radiation to produce a collimated beam for radiating the banknote, and the reflected radiation from the banknote is focused and directed to the receiver 32 closely positioned at the focal point of the lens. With this arrangement, the signal produced by the opto-receiver more closely correlates with the optical properties of the scanned banknote.

The present optical arrangement, has been designed to accept that wobble of the banknote within the pathway cannot be eliminated and as such the separation distance of the banknote from the optical sensor will vary. The effect of this varying distance has been reduced, due to using a collimated beam of radiation for exposing the banknote. The structure also positions a planar surface of the optical lens to form a continuation of the pathway wall, and as such, additional optical members are eliminated. The lens has been designed to cause a large portion of any radiation reflected by the lens itself to be directed away from the receiver, or be focused at a point to one side of the receiver. In this way, measured radiation reflected by the lens is reduced and is generally the same for the radiation at different wave lengths.

This structure also uses a plurality of non-directional emitters for producing radiation of several different wave lengths. These wave lengths are selected to reveal certain inks used in fraudulent banknotes. Preferably, three of the emitters emit radiation in the visible range and two of the emitters emit radiation in the infrared range.

The present structure has resulted in improved accuracy of the scanning of the banknote and a simplified system.

With the present invention, a very simple construction for an optical sensor is realized. The lens is designed to act as a plug for the aperture in the pathway, and therefore, the lens acts to appropriately process the radiation, and as a window for the pathway. The flat surface of the lens forms a continuation of the walls of the pathway and does not change the position of the banknote as it moves past the optical sensor. The interior surface of the lens is made aspherical (hyperboloid-like). This shape reduces cross-talk between the emitters and the receiver. Basically, the radiation reflected by the flat surface of the lens is generally directed away from the receiver. In the present structure, the plurality of light emitters and the photo-detector are located in immediate proximity to the centreline of the lens and adjacent the focus of the lens. The radiation from the emitters form a collimated beam irradiating a banknote, and reflected radiation from the banknote is generally directed to the photo-detector. A further aspect of the structure is the flat surface of the lens which is used to close the port in the pathway. This reduces cross-talk by simplifying the optical path and reducing the amount of radiation that will be reflected. The plurality of emitters are located as close together as possible. This grouping, or clustering of the emitters, preferably produces signals of different wave lengths which are essentially equally effected by the properties of the optical system. In this way, the measured signal more accurately corresponds to the actual properties of the banknote.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A validator comprising a pathway through which a banknote is moved past an optical sensor which evaluates optical characteristics on a face of a banknote; said optical sensor comprising a lens, a plurality of radiation emitters and a radiation receiver, said lens having a first surface which is generally planar and a second surface which is convex with said surfaces defining a focal point of said lens which faces said convex surface, said pathway including an opening therein which receives said lens with said planar surface closing said opening and forming part of said pathway, said radiation emitters and said radiation receiver being closely clustered at said focal point and including a shield member which isolates said receiver from direct radiation of said emitters, said lens collimating the emitted radiation of said emitters to produce parallel rays of radiation for radiating a banknote as it moves past said sensor and to focus reflected radiation from said banknote that impinges said lens on said receiver, said convex surface of said lens being selected to direct radiation reflected by said convex surface away from said receiver to reduce cross talk between said receiver and said emitters.

2. A validator as claimed in claim 1, wherein said lens is an aspherical lens.

3. A validator as claimed in claim 2 wherein said emitters emit radiation of different wavelengths.

4. A validator as claimed in claim 2 wherein said emitters and said receivers are separated by a screening member.

5. A validator as claimed in claim 2 wherein said emitters include at least two different types of emitters to produce radiation having two desired wavelengths for investigating a banknote.

6. A validator as claimed in claim 1 wherein said emitters are non-directional emitters and said emitters are clustered together with minimal spacing therebetween.

7. A validator as claimed in claim 1 wherein said emitters and said receiver are all located on a common support attached to a circuit board.

8. A validator as claimed in claim 7 wherein said emitters include at least 5 emitters each of which emit a different wavelength of radiation.

9. In a validator for scanning banknotes, an optical sensor comprising a convex lens having a planar surface positioned in a port of wall of a pathway along which a banknote is moved, said planar surface forming a continuation of said wall, said lens cooperating with a plurality of emitters of collimate emitted radiation for investigating a banknote, and said receiver being positioned closely adjacent said emitters and separated therefrom to minimize direct radiation and wherein said emitters and said receiver are located at a focal point of said lens.

10. In a validator as claimed in claim 9 wherein said lens is an aspherical lens.

11. In a validator as claimed in claim 9 wherein said emitters are non-directional emitters and said receiver is non-directional.

* * * * *